United States Patent
Bousquet

(10) Patent No.: US 6,438,142 B1
(45) Date of Patent: Aug. 20, 2002

(54) METHOD FOR TDMA TRANSMISSION ON A PLURALITY OF CARRIER FREQUENCIES, CORRESPONDING SIGNAL AND RECEIVER

(75) Inventor: Jacques Bousquet, Croissy sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/180,775

(22) PCT Filed: Mar. 27, 1998

(86) PCT No.: PCT/FR98/00642

§ 371 (c)(1),
(2), (4) Date: Nov. 13, 1998

(87) PCT Pub. No.: WO98/44657

PCT Pub. Date: Oct. 8, 1998

(30) Foreign Application Priority Data

Mar. 28, 1997 (FR) .............................................. 97 03891

(51) Int. Cl.$^7$ ......................... H04B 7/216; H04B 7/212; H04L 27/30; H04Q 7/20
(52) U.S. Cl. ....................... 370/498; 370/335; 370/347; 370/442; 375/202; 455/434
(58) Field of Search .................................. 370/498, 442, 370/337, 280, 294, 321, 330, 336; 375/202, 203, 335, 337, 356; 455/454, 447, 448, 450

(56) References Cited

U.S. PATENT DOCUMENTS

| | | | | |
|---|---|---|---|---|
| 5,381,443 A | * | 1/1995 | Borth et al. ..................... | 375/1 |
| 5,506,863 A | * | 4/1996 | Meidan et al. ............... | 375/202 |
| 5,537,434 A | * | 7/1996 | Persson et al. ............. | 375/202 |
| 5,570,352 A | * | 10/1996 | Poyhonen ..................... | 370/18 |
| 5,581,548 A | * | 12/1996 | Ugland et al. ............... | 370/330 |
| 5,732,073 A | * | 3/1998 | Kusaki et al. ............... | 370/280 |
| 5,805,633 A | * | 9/1998 | Uddenfeldt .................. | 375/202 |

FOREIGN PATENT DOCUMENTS

| | | |
|---|---|---|
| GB | 2 294 845 A | 5/1996 |
| WO | WO 91/13502 | 9/1991 |
| WO | WO 92/10885 | 6/1992 |
| WO | WO 93/22849 | 11/1993 |
| WO | WO 95/12936 | 5/1995 |
| WO | WO 95/29562 | 11/1995 |

* cited by examiner

Primary Examiner—Wellington Chin
Assistant Examiner—M. Phan
(74) Attorney, Agent, or Firm—Sughrue Mion, PLLC

(57) ABSTRACT

The invention concerns a TDMA transmission method employing a plurality of carrier frequencies ($21_1$ through $21_N$) accessible selectively in receivers by frequency hopping, characterized in that said plurality of carrier frequencies comprises:

- a first set of at least one carrier frequency ($21_1$ through $21_2$) exclusively dedicated to transmitting signalling data, and
- a second set of carrier frequencies ($21_3$ through $21_N$) formed of the set of carrier frequencies that do not belong to said first set and exclusively dedicated to transmitting payload information.

The invention also concerns a corresponding signal and a corresponding receiver.

6 Claims, 1 Drawing Sheet

METHOD FOR TDMA TRANSMISSION ON A PLURALITY OF CARRIER FREQUENCIES, CORRESPONDING SIGNAL AND RECEIVER

The field of the invention is that of time division multiple access (TDMA) signal transmission using a plurality of carrier frequencies.

To be more precise, the invention concerns transmitting signalling data in such systems.

The invention finds applications in very many fields. For example, it can be used to transmit data via satellites to sites that are isolated and/or to which access is difficult, and more generally it can be used in any access network, especially mobile access networks.

Multicarrier TDMA systems are already known in themselves. The signals are conventionally organized into frames each made up of a predetermined number of time slots (for example 16). In those prior art systems, one time slot of each frame, conventionally the first time slot, is reserved for transmitting signalling.

FIG. 1 shows the corresponding signal structure. Each time slot 11 of each frame 12 is allocated entirely (i.e. for all the carriers) to signalling. The other time slots 13 are dedicated to transmitting payload data.

The above technique is relatively well suited to systems employing a limited number of carrier frequencies. However, if the system uses a large number of carriers (for example a few hundred carriers) a great deal of the capacity for transmitting information is lost without this being of any benefit.

For example, in the case of a system using frames made up of 16 time slots, it is clearly not necessary to have 500 (or more) carrier frequencies to transmit signalling every 16 slots.

One aim of the invention is to mitigate this drawback of the prior art. To be more precise, one object of the invention is to provide a multicarrier TDMA transmission method and a corresponding signal that optimize the allocation of transmission resources between signalling data and data conveying information (payload data).

In particular, one object of the invention is to provide a method of the above kind that is well suited to systems using a high number of carrier frequencies.

Another object of the invention is to provide a method of the above kind that is simple to put into practice at the transmitter and simple to use at the receiver.

Accordingly, a further object of the invention is to provide receivers for signals transmitted by the above method that are simple and low in cost and in particular that do not add any complexity compared to prior art receivers.

The above objects, and others that become apparent hereinafter, are achieved according to the invention by means of a TDMA transmission method employing a plurality of carrier frequencies accessible selectively in receivers by frequency hopping, said plurality of carrier frequencies comprising:

a first set of at least one carrier frequency exclusively dedicated to transmitting signalling data, and a second set of carrier frequencies formed of the set of carrier frequencies that do not belong to said first set and dedicated exclusively to transmitting payload information.

In other words, the invention is based on an approach that is the opposite of the prior art approach: instead of dividing signalling in the time domain, an approach in the frequency domain is proposed.

The above technique introduces great flexibility, especially when the number of carrier frequencies is high. The technique is advantageous as soon as the number of carrier frequencies forming said first set is less than or equal to the number of time slots forming the frames transmitted.

What is more, the fact that one or more carrier frequencies are permanently associated with signalling data simplifies receiver operation, in particular during call initialization.

Said carrier frequencies forming said first set can optionally be grouped together and can be placed at any location.

The invention also concerns receivers of signals transmitted by the above method. The receivers include means for selecting one of the carrier frequencies forming said plurality of carrier frequencies and adapted to select:

at times specified by said signalling data, the carrier frequency of said second set carrying payload data addressed to it, and otherwise, to obtain said signalling data, the carrier frequency belonging to said first set that is assigned to it.

The invention further concerns the structure of the TDMA signal produced when the above method is used.

Other features and advantages of the invention become more clearly apparent on reading the following description of a preferred embodiment of the invention given by way of illustrative and non-limiting example only and from the accompanying drawings, in which.

Figure 1:
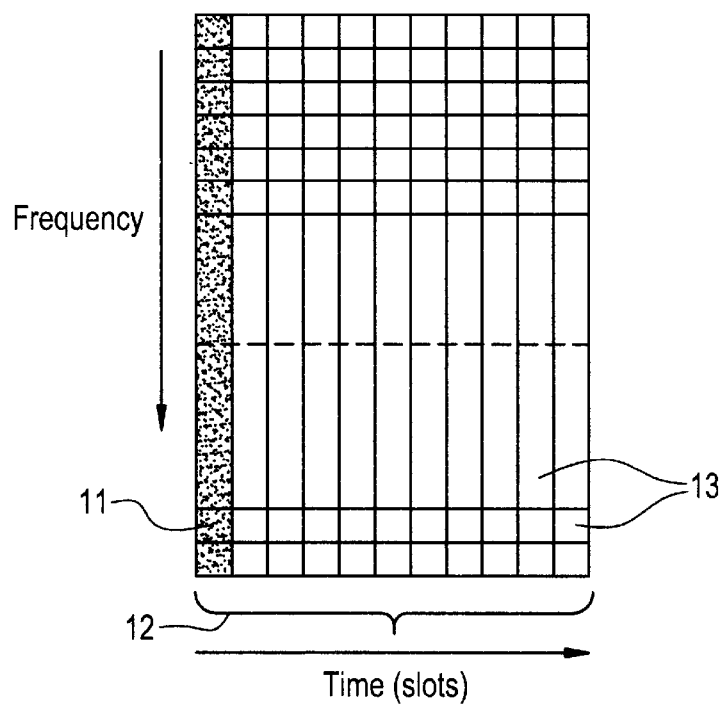
FIG. 1 shows the structure of a prior art multicarrier TDMA signal of the type commented on in the preamble.
Figure 2:
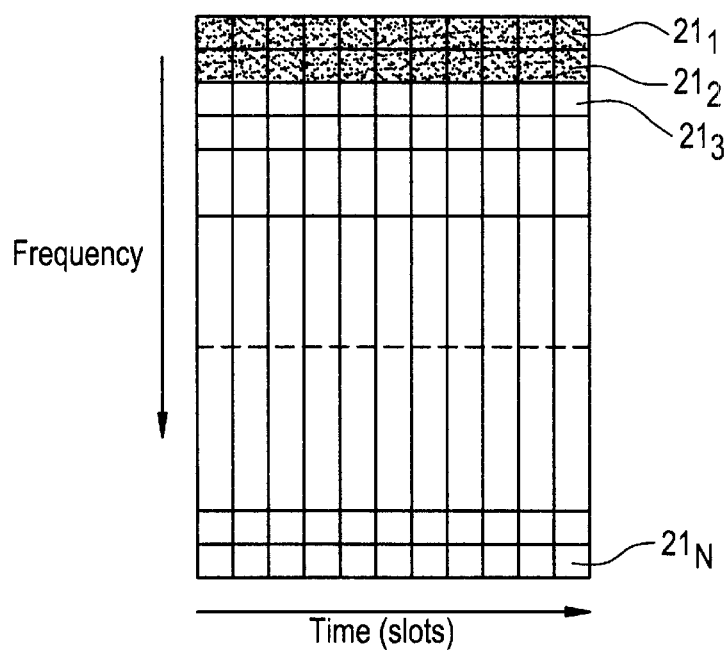
FIG. 2 shows the structure of a multicarrier TDMA signal in accordance with the invention in which two carrier frequencies are reserved for transmitting signalling.

The structure of the signal in accordance with the invention is shown in FIG. 2. It comprises N carrier frequencies $21_1$ through $21_N$ (for example N=500), of which n (for example n=2) carrier frequencies $21_1$ and $21_2$ are permanently reserved for signalling.

This technique has many advantages. In particular, the resource needed for signalling can be precisely adjusted by choosing the corresponding number n. Conventionally, n has a low value (denoting one carrier frequency or a few carrier frequencies), and is very small compared to N.

Consider the case of a signal organized into frames of P time slots (for example P=16); the technique of the invention is found to become advantageous very quickly, for example as soon as: n/N<1/P.

The improvement is highly significant, for example in the case where P=16, N=500 and n=3 the resources allocated to signalling are in a ratio of:

1/P=1/16 using the conventional technique, or n/N=3/500 using the invention, representing an improvement by a factor of about 10.

Also, the technique is simple to put into practice in the receivers, which continuously select a carrier $21_1$ until signalling information concerning them is found.

Then, by frequency hopping, they go to the carrier or carriers specified by the signalling to receive the data addressed to them. Then they go to the appropriate signalling carrier frequency to obtain the necessary signalling information.

I claim:

1. A TDMA transmission method employing a plurality of carrier frequencies accessible selectively in receivers by frequency hopping, characterized in that said plurality of carrier frequencies comprises:

a first set of at least one carrier frequency exclusively dedicated to transmitting signaling data, and a second set of carrier frequencies formed of the set of carrier frequencies that do not belong to said first set and exclusively dedicated to transmitting payload information.

2. A method according to claim 1, characterized in that the number of carrier frequencies forming said first set is less than or equal to the number of time slots forming the frames transmitted.

3. A receiver for signals transmitted by a TDMA transmission method using a plurality of carrier frequencies selectively accessible in receivers by frequency hopping, in which receiver said plurality of carrier frequencies comprise:

a first set of at least one carrier frequency exclusively dedicated to transmitting signaling data, and a second set of carrier frequencies formed of the set of carrier frequencies that do not belong to said first set and exclusively dedicated to transmitting payload information, characterized in that it comprises means for selecting one of the carrier frequencies forming said plurality of carrier frequencies to select:

at times specified by said signaling data, the carrier frequency of said second set carrying payload data addressed to it, and otherwise, to obtain said signaling data, the carrier frequency belonging to said first set that is assigned to it.

4. A TDMA signal made up of a plurality of carrier frequencies carrying payload data to be selectively received by a plurality of receivers, characterized in that said plurality of carrier frequencies comprises a first set of at least one carrier frequency exclusively dedicated to transmitting signaling data, and a second set of carrier frequencies formed of the set of carrier frequencies that do not belong to said first set and exclusively dedicated to transmitting payload information.

5. A method of time division multiple access (TDMA) communication, comprising:

employing a plurality of carrier frequencies accessible selectively in receivers by frequency hopping;

transmitting only signaling data on a first set of said plurality of carrier frequencies;

transmitting only payload information on a remainder of said plurality of carrier frequencies not including said first set.

6. A method according to claim 5, wherein:

said TDMA communication includes time slots forming transmitted frames; and a number of carrier frequencies forming said first set of said plurality of carrier frequencies is less than or equal to the number of said time slots forming said frames.

* * * * *